United States Patent [19]

Rosenthal et al.

[11] Patent Number: 4,765,077
[45] Date of Patent: Aug. 23, 1988

[54] DIRECTORY SUPPORT FRAME

[76] Inventors: Jeffery Rosenthal, 11616 Chenault, #6, Brentwood, Calif. 90049; Victor Parker, 10509 Larine, Chatsworth, Calif. 91311; James Hoback, 25773 Alta Dr., Valencia, Calif. 91355; Robert Summers, 5 Coventry Dr., Freehold, N.J. 07728

[21] Appl. No.: 737,222

[22] Filed: May 22, 1985

[51] Int. Cl.⁴ .............................................. G09F 3/00
[52] U.S. Cl. ....................................... 40/308; 40/585; 40/611
[58] Field of Search ............... 40/308, 156, 10 R, 572, 40/585, 611

[56] References Cited

U.S. PATENT DOCUMENTS

| | | | |
|---|---|---|---|
| 1,116,942 | 11/1914 | Smith | 40/308 |
| 1,879,554 | 9/1932 | Simkins | 40/611 |
| 2,111,780 | 3/1938 | Horton | 40/611 |
| 2,507,578 | 5/1950 | Schilperoot | 40/611 |
| 3,024,554 | 3/1962 | Kempher | 40/308 |
| 3,955,841 | 5/1976 | Hensel | 40/308 |
| 4,217,711 | 8/1980 | Spresser et al. | 40/308 |
| 4,475,300 | 10/1984 | Ledemican | 40/611 |
| 4,518,080 | 5/1985 | Ohlson | 40/10 R |

FOREIGN PATENT DOCUMENTS

| | | | |
|---|---|---|---|
| 202749 | 8/1923 | United Kingdom | 40/611 |
| 1248451 | 10/1971 | United Kingdom | 40/10 R |
| 1511496 | 5/1978 | United Kingdom | 40/10 R |

Primary Examiner—Robert P. Swiatek
Assistant Examiner—Cary E. Stone
Attorney, Agent, or Firm—Spensley Horn Jubas & Lubitz

[57] ABSTRACT

A directory frame for receiving a directory card or the like for use on a shopping cart. A pair of frame members are mounted back-to-back on a shopping cart and are adapted to receive a store directory or product advertisement placard. A raised rim portion extends around the periphery of the frame members to position the directory cards, while tab sections in the directories align with and are inserted into slots in the frame members to affix the directory cards. There are apertures in each corner of the frame member for receiving the corners of a directory card. Insertion and removal of directory cards can be accomplished without the aid of hand tools.

35 Claims, 2 Drawing Sheets

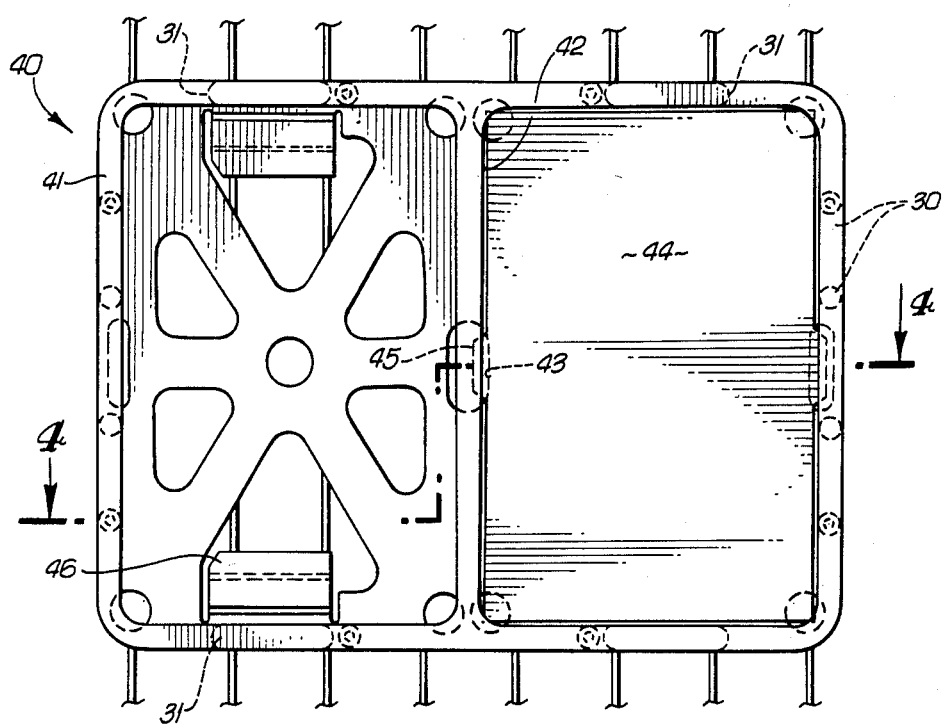
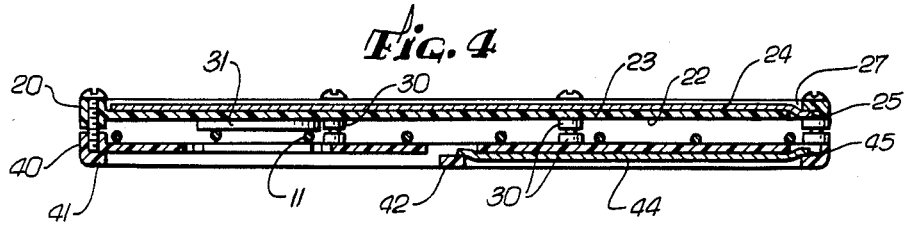
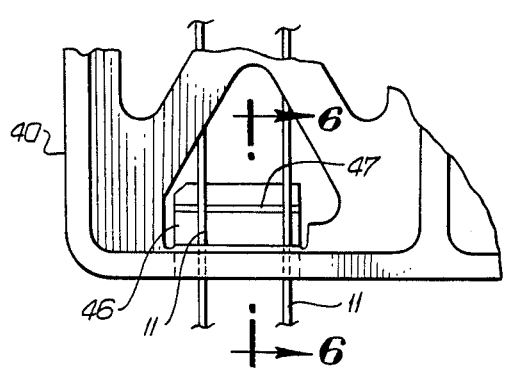
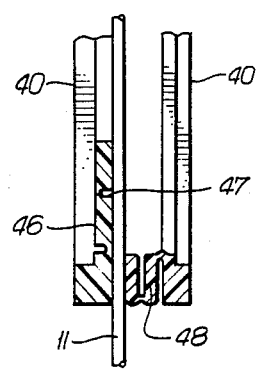

DIRECTORY SUPPORT FRAME

BACKGROUND OF THE INVENTION

The invention relates generally to a directory frame for use in combination with a shopping cart. More particularly, a frame member is provided to receive a shopping directory card or advertisement placard to be mounted on a shopping cart.

In general, the large shopping centers and food markets typically have thousands of items of products stacked on shelves and arranged in aisles. These thousands of products are typically grouped together where they are essentially the same product but differ in brand or manufacturer. As is often the case, the department store or food store can assist the shopper by indicating in which aisles particular items may be found. For example, a shopping directory may be hung from a ceiling or placed on a stand at either end of an aisle. There are several problems associated with directories which must be hung from the ceiling over a particular area of the store or above a certain aisle. For example, in a very large store it is often difficult to see what is in a particular aisle or in a particular section of the store when one is located at the opposite end of the store. Also, because the printing on such directories must be large enough to be readable from a distance, fewer items can be listed on such a directory. Finally, if the store relocates a certain product, the directory will have to be changed or replaced.

In an effort to solve such problems, the prior art devices, such as shown in U.S. Pat. No. 3,956,841, attempt to fix a directory to the wire basket of a shopping cart. Although this solves some problems, the directories are permanently fixed (riveted) to a frame member attached to the shopping cart. If a product is moved to a different aisle or an entire product line is discontinued, all of the directories would be obsolete, and because they are fixed to the frame, replacement is difficult and costly.

The present invention simplifies the directory problem by providing a pair of frame members which fasten to the wire frame of a shopping cart and which are capable of receiving a directory card so shoppers can see the directory whether they are pushing or pulling the shopping cart. The frame member is constructed such that a directory can be easily inserted, without hand tools, or removed if and when the directory becomes obsolete. In addition, as opposed to putting a directory in the frame member, product advertisements can be inserted in the frame member.

SUMMARY OF THE INVENTION

The present invention eliminates the foregoing problems associated with directories which are suspended from the ceiling of a shopping center, or ones which may be mounted on prior art brackets. The present invention provides a pair of frame members for receiving a directory card or the like, or an advertisement placard which can be easily inserted or removed from the frame members. Each frame member has a front surface and a rear surface with a raised rim portion extending continuously along the periphery of the frame member on the front surface. The rear surface has a plurality of elongated slots on the periphery and opposite the rim for receiving tab sections which are on the directories or advertising placards. When a directory card is inserted into the frame member, the tab sections will correspond with the elongated slots in the rear surface and the directory card will be positioned inside the raised rim portion.

A plurality of support pads are located along the periphery of the rear surface of the frame member and opposite the rim portion, in order to space the rear surface of one frame member from the rear surface of the second frame member when two frame members are mounted back-to-back. Some of the support pads will have holes through them which will align with holes in the support pads of the second frame member for receiving a fastening means, such as a screw fastener, in order to secure the frame members to the wire frame of the shopping cart. In a typical mounting situation, two frame members would be mounted back-to-back in the area of the basket of the shopping cart, with the vertical cart wires positioned between a first and second frame member. In this situation, a directory card or advertising placard would be visible to the shopper as the shopper pushed the shopping cart by the handle, while a second directory card or advertising placard would be visible from the front of the shopping cart.

A plurality of spacers are mounted on the rear surface of the frame member, opposite the raised rim portion, to provide a uniform spacing between the frame members when two frame members are mounted back-to-back. In addition, the spacers lend a certain degree of rigidity to the frame member.

The foregoing objectives, feature and advantages of the present invention will be more readily understood upon consideration of the following detailed description of the invention taken in conjunction with the accompanying drawings.

BRIEF DESCRIPTION OF THE DRAWINGS

FIG. 3 is a front view of a frame member having a divider along its vertical axis to divide the frame member into right and left hand sections for displaying individual directories;

FIG. 4 is a cross-sectional view taken substantially along line 4—4, illustrating the frame member as shown in FIG. 2 and the frame member as shown in FIG. 3 as they are mounted on the shopping cart;

FIG. 5 is a partial front view of a frame member illustrating a hinge; and

FIG. 6 is a cross-sectional view taken substantially along line 6—6, illustrating the hinged spacer in its folded condition.

DETAILED DESCRIPTION OF THE PREFERRED EMBODIMENT

Figure 1:
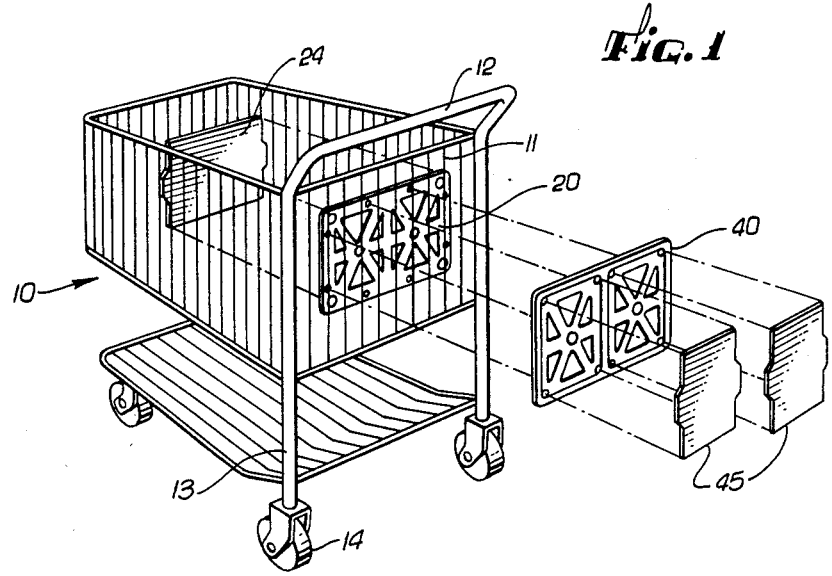
FIG. 1 is an exploded perspective view of a typical shopping cart illustrating several frame members and directories as they would be mounted on the wire supports of the shopping cart.

As illustrated in FIG. 1, there is shown a typical shopping cart 10 which is provided by the department store or food market for the convenience of shoppers when shopping for items or products in the store. As illustrated, shopping cart 10 is comprised of a wire basket or frame 11, a handle 12 with a cart support frame 13, and wheels 14. The shopping cart 10 is shown only as an example and may have numerous other configurations. For example, many shopping carts have a wire basket in which a small child may ride, or in which the shopper may wish to separate easily damaged items from other heavier items in the other part of the shopping cart. The particular configuration of a shopping cart or even a shopping basket does not affect the spirit and scope of the invention.

Figure 2:
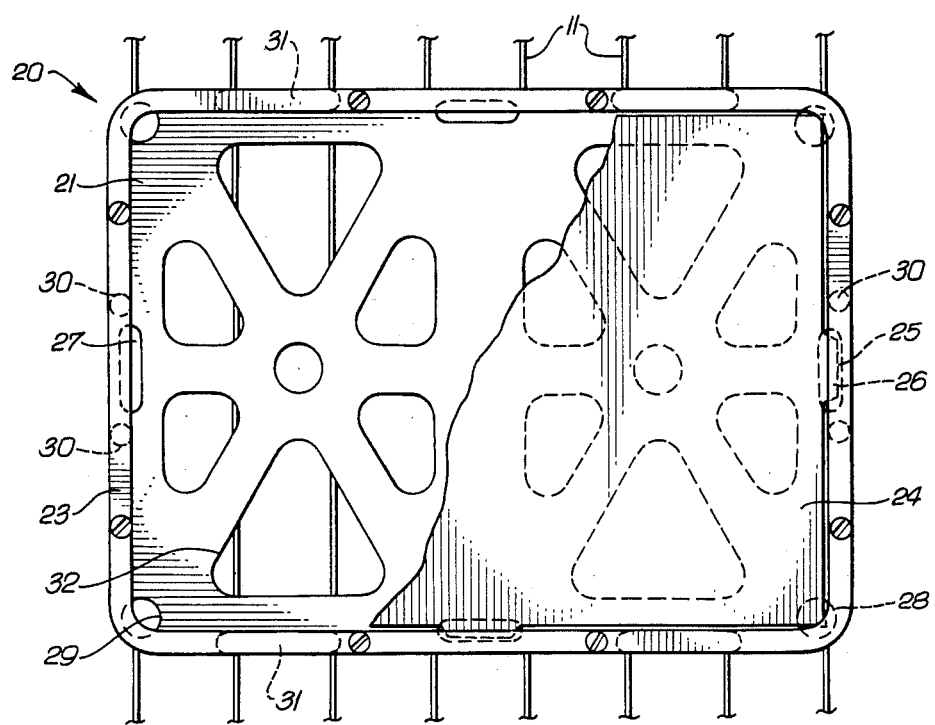
FIG. 2 is a front view of the frame member with a section of a directory inserted therein.

In keeping with the invention and turning to FIGS. 2 and 4, there is shown a generally rectangular frame member 20 having a frame surface 21 and a rear surface 22. To add rigidity and support to frame member 20, a raised rim portion 23 extends upwardly from front surface 21 a short distance and it extends around the entire periphery of frame member 20. In addition to lending support to frame member 20, raised rim portion 23 is adapted to receive directory card 24. When directory card 24 is placed onto front surface 21, it is retained in position by raised rim portion 23. As is clearly depicted in FIGS. 2 and 4, directory card 24 has tab sections 25 along its periphery which slide into elongated slots 26 in rear surface 22. Because directory card 24 is intended to be made of a flexible material, tab sections 25 will flex and slightly deform as they are inserted into slots 26. Tab sections 25 should be of sufficient length so that they extend partly under rim portion 23, and into groove 27 formed by the slot 26 and rim 23.

In order to further position and contain directory card 24 in frame member 20, apertures 28 are located in the rear surface 22 at each corner of frame member 20. Directory card 24 will have sharp corners which will slide under rim portion 23 and into apertures 28 thereby securing directory card 24 in the frame member. The corners of directory card 24 slide into undercut section 29 which is formed by aperture 28 extending partially under rim portion 23.

It is intended that frame member 20 be mounted such that the rear surface 22 is adjacent to the rear surface of a second frame member (discussed below) with the wire basket 11 sandwiched between the two frame members. In order to insure the proper spacing between the two frame members, a plurality of support pads 30 are located on rear surface 22 opposite the raised rim portion 23. Some of the support pads 30 will have holes extending through the support pad and through the raised rim portion 23 for purpose of receiving a screw or other conventional fastening device so that one frame member may be connected to a second frame member, as shown in FIG. 4. Other of the support pads 30 will not have holes in them and they are provided simply for spacing one frame member from a second frame member and to lend support and rigidity to the frame members. The support pads 30 project approximately one half of the distance between the frame members.

A plurality of spacers 31 are positioned on rear surface 22 and should be of sufficient length such that they would span at least any two adjacent verticle wire members on the shopping cart. The spacers 31 provide a barrier between the frame member 20 and the wire basket 11 so that the metal wires which comprise a typical shopping cart will not rub on and perhaps damage the frame member 20. The spacers 31 also keep two frame members in spaced, parallel relationship.

Because the directory 24 is held in frame member 20 by inserting tab sections 25 into elongated slots 26 and by inserting the corners of the directory card into apertures 28, the directory card can be easily inserted or removed without any special tools. To insert the flexible directory, each tab section 25 and each corner of the directory card are bent slightly, and each is inserted into its respective slot 26 and aperture 28. For removal, by simply pressing upon the corner of a directory card 24 directly over an aperture 28, an adjacent portion of the directory card will rise above rim portion 23 because it is made of a flexible material. Once an edge of the directory card 24 is above the rim portion 23, it can be easily grasped with one's fingers and pulled away from the frame member 20.

As is shown in FIG. 2, a plurality of removed sections 32 are centrally provided on frame member 20 simply to reduce the weight of the frame member. It is contemplated that the frame member be made of a durable plastic material, with the thickness between the front and rear surfaces to be a relatively thin section so that the frame will be somewhat flexible. It is desired, however, that the section around raised rim portion 23 be of a greater thickness to enhance the rigidity and structural integrity of the frame member 20. Thus, removed sections 31 will not detract from the overall structural integrity of the frame member 20, but will simply provide a weight advantage to the frame member. Although in the preferred embodiment it is intended that the frame member be made of a durable plastic material, such as polypropylene, other materials such as metal frames are also contemplated.

In further keeping with the invention, and turning to FIG. 3, a second frame member 40 is provided which is substantially similar to the frame member 20 described above. As is shown, frame member 40 differs from frame member 20 in that raised rim portion 41 extends continuously around the outer periphery of frame member 40, and also includes a center divider 42 extending vertically along a central axis of the frame member, essentially dividing it into a right and left hand section. This center divider 42 is structurally identical to the raised rim portion 23 described above. Elongated slots 43 are also provided in frame member 40 to correspond with and receive right and left hand directory cards 44. Tab sections 45, which are on the right and left hand directory cards 44, align with and are inserted into slots 43 for positioning and holding directory cards 44 in frame member 40.

As is shown in FIGS. 3 and 4, the right and left hand directory cards 44 are approximately one-half the size of directory card 24 which fits in frame member 20. The method for inserting and removing right and left hand directory cards 44 is the same as that described for directory card 24.

Another difference between frame member 40 and frame member 20, as shown in FIG. 3, are the foldable hinged spacers 46, illustrated in their unfolded position. In the preferred embodiment, frame member 40 and frame member 20 will be mounted back-to-back, on shopping cart 10, with the wire frame 11 of the shopping cart situated between the two frame members. This embodiment is illustrated in FIG. 4, where frame member 20 is securely fastened to frame member 40. It is noted that spacers 31 of frame member 20 abut the wire frame 11 of the shopping cart, with the hinged spacers 46 remaining in an unfolded state. Hinged spacers 46 will be folded along score lines 47 to create a spacer 48, similar to spacers 31, only when two frame members 40 are fastened back-to-back together in an alternative mounting arrangement as illustrated in FIG. 6. In other words, foldable hinges will not be folded to provide spacers 48 when frame member 40 is fastened to frame member 20.

As can be seen in FIGS. 5 and 6, two frame members 40 are mounted back-to-back, and foldable hinges 46 have been bent to provide spacers 48 which ride up against the wire frame 11. In this embodiment, a right and left hand directory card will be mounted in each frame member 40, providing two directory cards facing the shopper and two directory cards facing away from the shopper.

Although frame member 40 is described and illustrated as having substantially equal right and left hand sections, it is intended that the frame member can be divided into any number of sections to receive separate directory cards. It would be especially advantageous for product advertisements to be one-half or one-quarter page sized and be mounted in corresponding sections of frame member 40.

As used herein, the words "directory" or "directory cards" are intended to mean any type of informational device which will assist the shopper in making selections during the shopping process. The word directory is not intended to be a limitation, rather it is a description of the type of information which can be mounted in the frame member of the invention. It is intended that directory cards or placards which are advertisements of a company's particular product or products, be used in conjunction with the subject invention.

The invention thus provides a pair of frame members which are securely fixed to a shopping cart for receiving replaceable directory cards or product advertisement placards. The directory cards are easily inserted or removed from the frame members by hand, without resorting to hand tools. Although made of flexible plastic or similar material, the directory cards remain secure and stable as mounted in the frame members.

We claim:

1. A directory frame for receiving a directory card or the like for use in combination with a shopping cart having a basket, the directory frame to be mounted to the shopping basket of the cart to facilitate shopping for items in a store, the directory frame comprising:
   a pair of frame members each having a front surface and a rear surface, said rear surface having a plurality of elongated slots for receiving tab sections of said directory card;
   a raised rim portion on each frame member extending substantially continuously along the periphery of said frame member front surface;
   a plurality of support pads on each frame member located along the periphery of said rear surface of said frame member to space said rear surface of one said frame member from the rear surface of the other said frame member when said frame members are mounted back-to-back;
   means for fastening said pair of frame members on the shopping cart in back-to-back relation with a wall of the cart basket positioned between the frames members so that both frame members are held in position by pressure on the wall of the shopping cart basket; and
   a plurality of spacers positioned between said basket wall and said rear surface of at least one of said frame members opposite said rim portion to provide uniform spacing between said frame members when said frame members are mounted back-to-back.

2. The directory frame as described in claim 1 wherein said rear surface of each frame member has a plurality of removed sections to reduce the weight of said frame member.

3. The directory frame as described in claim 1 wherein each of said frame members is substantially rectangular.

4. The directory frame as described in claim 1 wherein said elongated slots project partially under said rim portion to define a groove for receiving said tab sections of said directory card.

5. The directory frame as described in claim 1 wherein at least one said frame member has a center divider along its central vertical axis dividing said front surface of said frame member into substantially equal right and left hand sections for receiving a right and left hand directory card.

6. A directory frame for receiving a directory card or the like for use in combination with a shopping cart, the directory frame to be mounted to the shopping cart to facilitate shopping for items in a store, the directory frame comprising:
   a pair of frame members each having a front surface and a rear surface, said rear surface having a plurality of elongated slots for receiving tab sections of said directory card;
   a raised rim portion on each frame member extending substantially continuously along the periphery of said frame member front surface;
   a plurality of support pads on each frame member located along the periphery of said rear surface of said frame member to space said rear surface of one said frame member from the rear surface of the other said frame member when said frame members are mounted back-to-back;
   means for fastening said pair of frame members on the shopping cart in back-to-back relation; and
   a plurality of spacers on said rear surface of at least one of said frame members opposite said rim portion to provide uniform spacing between said frame members when said frame members are mounted back-to-back;
   wherein said rear surface of each frame member further comprises an aperture located at each corner of said frame member for receiving the corresponding corner of said directory card, and when said directory card is pressed at said aperture location, a portion of said directory card will rise away from an adjacent rim portion to facilitate manual removal of said directory card.

7. The directory frame as described in claim 6 wherein said apertures project partially under said rim portion to define an undercut section for receiving the corners of said directory card.

8. A directory frame for receiving a directory card or the like for use in combination with a shopping cart, the directory frame to be mounted to the shopping cart to facilitate shopping for items in a store, the directory frame comprising:
   a pair of frame members each having a front surface and a rear surface, said rear surface having a plurality of elongated slots for receiving tab sections of said directory card;
   a raised rim portion on each frame member extending substantially continuously along the periphery of said frame member front surface;
   a plurality of support pads on each frame member located along the periphery of said rear surface of said frame member to space said rear surface of one said frame member from the rear surface of the other said frame member when said frame members are mounted back-to-back;

means for fastening said pair of frame members on the shopping cart in back-to-back relation; and a plurality of spacers on said rear surface of at least one of said frame members opposite said rim portion to provide uniform spacing between said frame members when said frame members are mounted back-to-back;

wherein at least one of said frame members has a hinged spacer on said rear surface for providing a space between said frame members when mounted in back-to-back relation, said hinged spacer adding rigidity to said frame member and keeping said frame members in parallel spaced relation.

9. A directory frame for receiving a directory card or the like for use in combination with a shopping cart, the directory frame to be mounted to the shopping cart to facilitate shopping for items in a store, the directory frame comprising:

a pair of frame members each having a front surface and a rear surface, said rear surface having a plurality of elongated slots for receiving tab sections of said directory card;

a raised rim portion on each frame member extending substantially continuously along the periphery of said frame member front surface;

a plurality of support pads on each frame member located along the periphery of said rear surface of said frame member to space said rear surface of one said frame member from the rear surface of the other said frame member when said frame members are mounted back-to-back;

means for fastening said pair of frame members on the shopping cart in back-to-back relation; and a plurality of spacers on said rear surface of at least one of said frame members opposite said rim portion to provide uniform spacing between said frame members when said frame members are mounted back-to-back;

wherein at least some of said support pads on one said frame member have holes which align with holes in said support pads of said other frame member, said fastening means comprising fastening screws extending through said holes to securely fasten said frame members in back-to-back relation with the shopping cart wires positioned between said frame members.

10. A directory frame for receiving a directory card or the like having tab sections for use in combination with a shopping art having a frame, the directory frame to be mounted to the shopping art to facilitate shopping for items in a store, the directory frame comprising:

a pair of separate frame members each having a front surface and a rear surface, said rear surface having a plurality of elongated slots for receiving tab sections of said directory card;

a raised rim portion on each frame member extending substantially continuously along the periphery of said frame member front surface, said rim portion further extending along the central vertical axis of at least one said frame member to divide said frame member into substantially equal right and left hand sections, said right and left hand sections for receiving individual right and left hand directory cards;

a plurality of support pads on each frame member located along the periphery of said rear surface of said frame members to space said rear surface of one said frame members from the rear surface of the other said frame member when said frame members are mounted back-to-back;

at least one spacer carried by one of said frame members and adapted to engage the cart frame; and means for fastening one said frame member to the other said frame member back-to-back on said shopping cart so that each frame member is held in position by the spacer being pressured against the frame of the shopping cart.

11. The directory frame as described in claim 10 wherein said rear surface of each frame member has a plurality of removed sections to reduce the weight of said frame member.

12. The directory frame as described in claim 10 wherein each of said frame members is substantially rectangular.

13. The directory frame as described in claim 10 wherein said right and left hand sections are substantially rectangular in shape.

14. A directory frame for receiving a directory card or the like for use in combination with a shopping cart, the directory frame to be mounted to the shopping cart to facilitate shopping for items in a store, the directory frame comprising:

a pair of frame members each having a front surface and a rear surface, said rear surface having a plurality of elongated slots for receiving tab sections of said directory card;

a raised rim portion on each frame member extending substantially continuously along the periphery of said frame member front surface, said rim portion further extending along the central vertical axis of at least one said frame member to divide said frame member into substantially equal right and left hand sections, said right and left hand sections for receiving individual right and left hand directory cards;

a plurality of support pads on each frame member located along the periphery of said rear surface of said frame members to space said rear surface of one said frame member from the rear surface of the other said frame member when said frame members are mounted back-to-back; and means for fastening one said frame member to the other said frame member on said shopping cart;

wherein said rear surface of at least one said frame member further comprises apertures located at each corner of said right and left hand sections for receiving the corners of the right hand and left hand directory cards, and when each said directory card is pressed at its corner locations whereat exist said apertures, a portion of said directory card will rise away from an adjacent rim portion to facilitate removal.

15. The directory frame as described in claim 14 wherein said apertures project partially under said rim portion to define an undercut section for receiving the corners of said directory card.

16. The directory frame as described in claim 14 wherein said elongated slots project partially under said rim portion to define a groove for receiving said tab sections of said directory card.

17. The directory frame as described in claim 14 wherein said apertures project partially under said rim portion.

18. A directory frame for receiving a directory card or the like for use in combination with a shopping cart, the directory frame to be mounted to the shopping cart to facilitate shopping for items in a store, the directory frame comprising:

a pair of frame members each having a front surface and a rear surface, said rear surface having a plurality of elongated slots for receiving tab sections of said directory card;

a raised rim portion on each frame member extending substantially continuously along the periphery of said frame member front surface, said rim portion further extending along the central vertical axis of at least one said frame member to divide said frame member into substantially equal right and left hand sections, a said right and left hand sections for receiving individual right and left hand directory cards;

a plurality of support pads on each frame member located along the periphery of said rear surface of said frame members to space said rear surface of one said frame members from the rear surface of the other said frame member when said frame members are mounted back-to-back; and means for fastening one said frame member to the other said frame member on said shopping cart;

wherein at least one of the said frame members has a hinged spacer on said rear surface for providing a space between said frame members when mounted in back-to-back relation, said hinged spacer adding rigidity to said frame member and keeping said frame members in parallel spaced relation.

19. A directory frame for receiving a directory card or the like for use in combination with a shopping cart, the directory frame to be mounted to the shopping cart to facilitate shopping for items in a store, the directory frame comprising:

a pair of frame members each having a front surface and a rear surface, said rear surface having a plurality of elongated slots for receiving tab sections of said directory card;

a raised rim portion on each frame member extending sustantially continuously along the periphery of said frame member front surface, said rim portion further extending along the central vertical axis of at least one said frame member to divide said frame member into substantially equal right and left hand sections, said right and left hand sections for receiving individual right and left hand directory cards;

a plurality of support pads on each frame member located along the periphery of said rear surface of said frame members to space said rear surface of one said frame member from the rear surface of the other said frame member when said frame members are mounted back-to-back; and means for fastening one said frame member to the other said frame member on said shopping cart;

wherein at least some of said support pads on one said frame member have holes which align with holes in said support pads of said other frame member, said fastening means comprising fastening screws extending through said holes to securely fasten said frame members in back-to-back relation with the shopping cart wires positioned between said frame members.

20. A directory frame for receiving a directory card or the like for use in combination with a shopping cart, the directory frame to be mounted to the shopping cart to facilitate shopping for items in a store, the directory frame comprising:

a pair of frame members each having a front surface and a rear surface, said rear surface having a plurality of elongated slots for receiving tab sections of said directory card;

a raised rim portion on each frame member extending substantially continuously along the periphery of said frame members front surface;

a plurality of support pads on each frame member located along the periphery of said rear surface of one said frame member to space said rear surface of said frame member from the rear surface of the other said frame member when said frame members are mounted back-to-back;

means for fastening one said frame member to the other said frame member on said shopping cart; and a plurality of hinged spacers on said rear surface of at least one said frame, member which when folded provide spacers on said rear surface of said frame member to space said frame member from the other said frame member when said frame members are mounted back-to-back.

21. The directory frame as described in claim 20 wherein said hinged spacers are folded along score lines to provide a plurality of spacers on said rear surface of one of said frame members, opposite said rim portion, said spacers further providing a barrier between said shopping cart and frame member and to uniformly space one said frame member from the other said frame member when said frame members are mounted back-to-back.

22. The directory frame as described in claim 21 wherein at least some of said support pads on one said frame member have holes which align with holes in said support pads of said other frame member, said fastening means comprising fastening screws extending through said holes to securely fasten said frame members in back-to-back relation with the shopping cart wires positioned between said frame members.

23. The directory frame as described in claim 20 wherein said rear surface of each frame member has a plurality of removed sections to reduce the weight of said frame member.

24. The directory frame as described in claim 20 wherein each of said frame members is substantially rectangular.

25. The directory frame as described in claim 20 wherein said rear surface of each frame member further comprises an aperture located at each corner of said frame member for receiving the corresponding corner of a directory, and when said directory card is pressed at said aperture location, a portion of said directory card will rise away from an adjacent rim portion to facilitate manual removal of said directory card.

26. The directory frame as described in claim 20 wherein said apertures project partially under said rim portion to define an undercut section for receiving the corners of said directory card.

27. The directory frame as described in claim 20 wherein said elongated slots project partially under said rim portion to define a groove for receiving said tab sections of said directory card.

28. A directory frame for receiving a directory card having a plurality of outwardly projecting tabs about the periphery thereof, said directory frame comprising:

a generally flat frame member having a front surface and a rear surface, said front surface including a raised rim portion extending substantially continuously about the periphery of said frame member and said rear surface having a plurality of slots formed therein in positions for aligned reception of the directory card tabs and at least one aperture, the tab slots and aperture being at least partially masked from the front surface by said rim portion;

where said rear surface further comprises an aperture located at each corner of said frame member for receiving the corresponding corner of a directory, and when said directory card is pressed at a corner location of said aperture, a portion of said directory card will rise away from an adjacent rim portion to facilitate manual removal of said directory card.

29. The directory frame as described in claim 28 wherein said frame member has a center divider along its central vertical axis dividing said front surface of said frame member into substantially equal right and left hand sections for receiving a right and left hand directory card.

30. The directory frame as described in claim 28 wherein said frame member has a plurality of spacers on said rear surface, opposite said rim portion, to space said one frame member from a second said frame member when said frame members are mounted in back-to-back relation.

31. A directory frame for receiving a directory card having a plurality of outwardly projecting tabs about the periphery thereof, said directory frame comprising:
   a generally flat frame member having a front surface and a rear surface, said front surface including a raised rim portion extending substantially continuously about the periphery of said frame member and said rear surface having a plurality of slots formed therein in positions for aligned reception of the directory card tabs and at least one aperture, the tab slots and aperture being at least partially masked from the front surface by said rim portion;
   wherein said frame member has a plurality of support pads along the periphery of said rear surface of aid frame member, opposite said rim portion, to provide fastening means when one said frame member is fastened to another said frame member, at least some of said support pads having holes for receiving a fastener when said support pads of one frame member align with and abut the support pads of another frame member, said support pads further providing spacing means to keep one said frame member in substantially parallel spaced relation to another said frame member when said frame members are mounted in back-to-back relation.

32. A directory frame for receiving a directory card having a plurality of outwardly projecting tabs about the periphery thereof, said directory frame comprising:
   a generally flat frame member having a front surface and a rear surface, said front surface including a raised rim portion extending substantially continuously about the periphery of said frame member and said rear surface having a plurality of slots formed therein in positions for aligned reception of the directory card tabs and at least one aperture, the tab slots and aperture being at least partially masked from the front surface by said rim portion;
   wherein said frame member has a plurality of hinged spacers on said rear surface to space said frame member from a second said frame member when said frame members are mounted in back-to-back relation.

33. The directory frame as described in claim 32 wherein said hinged spacers are folded along score lines to provide a plurality of spacers on said rear surface of one of said frame members, opposite said rim portion, said spacers providing a barrier between said shopping cart and frame member and to uniformly space one said frame member from the other said frame member when said frame members are mounted back-to-back.

34. The directory frame as described in claim 33 wherein said frame members are substantially identical.

35. A directory frame for receiving a directory card or the like for use in combination with a shopping cart having a basket, the directory frame to be mounted to the basket of the shopping carts to facilitate shopping for items in a store, the directory frame comprising:
   a pair of separate frames each frame being adapted to receive a card;
   a hinged spacer carried by one frame and adapted to be folded against the wall of the shopping cart basket; and
   means for fastening said pair of frames on the shopping cart in back-to-back relation with a wall of the cart basket positioned between the frame members so that both frames are held in position by pressure exerted through the spacer on the wall of the shopping cart basket.

* * * * *

UNITED STATES PATENT AND TRADEMARK OFFICE
CERTIFICATE OF CORRECTION

PATENT NO. : 4,765,077

DATED : August 23, 1988

INVENTOR(S) : Victor Parker; James Hoback; Douglas Kruse

It is certified that error appears in the above-identified patent and that said Letters Patent is hereby corrected as shown below:

Title page:

Under the heading "Inventors", delete "Jeffery Rosenthal, 11616 Chenault, #6, Brentwood, Calif. 90049" and "Robert Summers, 5 Coventry Dr., Freehold, N.J. 07728" and add -- Douglas Kruse, 20761 Plummer St., Chatsworth, Calif. -- to the list of inventors.

Signed and Sealed this

Nineteenth Day of December, 1989

Attest:

JEFFREY M. SAMUELS

Attesting Officer     Acting Commissioner of Patents and Trademarks